United States Patent
Endoh

(10) Patent No.: US 6,441,413 B1
(45) Date of Patent: Aug. 27, 2002

(54) SEMICONDUCTOR DEVICE HAVING THIN FILM RESISTORS MADE OF BOLOMETER MATERIALS

(75) Inventor: Tsutomu Endoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/711,481

(22) Filed: Nov. 13, 2000

(30) Foreign Application Priority Data

Nov. 24, 1999  (JP) .......................................... 11-332822

(51) Int. Cl.$^7$ ............................................... H01L 21/20
(52) U.S. Cl. ...................................................... 257/293
(58) Field of Search ............................. 438/4, 48, 80, 438/88, 385–536; 257/290–293; 365/220–221, 189.11, 189.12; 250/214.1, 338.1, 338.4

(56) References Cited

U.S. PATENT DOCUMENTS

| | | | |
|---|---|---|---|
| 5,698,852 A | * 12/1997 | Tanaka et al. | 250/332 |
| 5,757,008 A | * 5/1998 | Akagawa et al. | 250/332 |
| 5,844,514 A | * 12/1998 | Ringh et al. | 341/118 |
| 5,952,695 A | * 9/1999 | Ellis-Monaghan et al. | 257/347 |
| 5,962,854 A | * 10/1999 | Endo | 250/338.1 |
| 5,965,892 A | * 10/1999 | Tanaka | 250/332 |
| 6,188,069 B1 | * 2/2001 | Endoh | 250/332 |
| 6,222,585 B1 | * 4/2001 | Endoh | 348/294 |

FOREIGN PATENT DOCUMENTS

| | | |
|---|---|---|
| JP | 08-105794 | 4/1996 |
| JP | 09-284651 | 10/1997 |
| JP | 10-304251 | 11/1998 |

* cited by examiner

*Primary Examiner*—George Fourson
*Assistant Examiner*—Thanh V Pham
(74) *Attorney, Agent, or Firm*—Hutchins, Wheeler & Dittmar

(57) ABSTRACT

A semiconductor device comprising bolometers arranged in two-dimensional form corresponding to pixels for converting incoming infrared rays into electrical signals includes vertical switches, a vertical shift register, horizontal switches, and a horizontal shift register as means for selecting an arbitrary pixel. The semiconductor device is configured to allow an overcurrent to be supplied to a bolometer in a pixel selected by those means.

7 Claims, 18 Drawing Sheets

|   | 1 | 2 | 3 | 4 |
|---|---|---|---|---|
| a | R | R | (R) | R |
| b | R | (R/2) | (R) | R |
| c | R | (R/2) | R | R |
| d | R | R | R | R |

Fig. 20

SEMICONDUCTOR DEVICE HAVING THIN FILM RESISTORS MADE OF BOLOMETER MATERIALS

BACKGROUND OF THE INVENTION

(1) Field of the Invention

The present invention relates to a semiconductor device in which thin film resistors made of bolometer materials are arranged in two-dimensional form corresponding to pixels. The present invention also relates to a trimming method performed in such a semiconductor device and a recording medium in which a program for executing the trimming is recorded.

(2) Description of the Prior Art

Semiconductor devices of this type include a thermal infrared imaging element, an infrared display apparatus, an ultrasonic sensor and the like in which the use of bolometer materials as a thin film resistor constituting part of a pixel or a sensor portion is typically known. For example, such devices include a thermal infrared imaging element which converts incident infrared rays into an electrical signal with a bolometer, an infrared display apparatus which provides a desired infrared image by supplying a bolometer with a predetermined bias voltage (or a bias current) to produce infrared rays (emit light), and the like. A configuration of such a thermal infrared imaging element is hereinafter described specifically as an example of the semiconductor device.

Each of Japanese Patent Laid-open. Publication No.8-105794 and Japanese Patent Laid-open Publication No.9-284651 discloses a thermal infrared imaging element comprising a plurality of thermoelectric converting elements arranged in matrix form which absorb and convert infrared rays radiated by respective portions of an object into heat which is converted into electrical signals for display as images. A pixel portion of the thermal infrared imaging element is shown in a sectional view in FIG. 1 and in a plan view in FIG. 2.

Referring to FIGS. 1 and 2, there is shown semiconductor substrate 20 on which scanning circuit 21 comprising a switch element and a shift register is formed, and silicon oxide film 22 partially including cavity 23 is formed on scanning circuit 21. A diaphragm (light receiving surface) defined by slit 26 is formed on cavity 23 in silicon oxide film 22. The diaphragm section has a three-layered configuration in which titanium bolometer 27, silicon oxide film 28, and titanium nitride 29 are sequentially stacked on silicon oxide film 22. On silicon oxide film 22, ground line 24, signal line 25, and vertical select line 30 which are made of aluminum (Al) are also formed. Signal line 25 is a vertical signal line and connected to titanium bolometer 27. Titanium bolometer 27, silicon oxide film 28, and titanium nitride 29 constituting the diaphragm are infrared absorbing layers in which the infrared rays reflected by titanium bolometer 27 is absorbed by titanium nitride 29. A plurality of scanning circuits 21 and a plurality of the diaphragms are integrated on semiconductor substrate 20 corresponding to pixels such that two-dimensional infrared images can be produced.

In the thermal infrared imaging element, when the infrared rays are incident on the diaphragm from above, the temperature of the diaphragm is changed and the electrical resistance value of titanium bolometer 27 is changed in accordance with the change in the temperature. The change in the resistance value of titanium bolometer 27 is electrically acquired through a read circuit and read to the outside as an infrared image.

FIG. 3 is a circuit diagram of the aforementioned thermal infrared imaging element. FIG. 4 is a timing chart for describing the operation of the thermal infrared imaging element.

As shown in FIG. 3, a pixel comprising bolometer 201 and vertical switch 202 is connected to vertical signal line 203 and further connected to horizontal switch 204. Four horizontal switches 204 are connected to one read circuit 206, and an output from each of read circuits 206 are sequentially provided through multiplexers 207 and output buffer 209 to the outside from output terminal 210. Read circuit 206 can be formed of an integrating circuit, a sample hold circuit, or the like, for example.

In the thermal infrared imaging element, as shown in FIG. 4, while an output (for example, V1) from vertical shift register 205 is at "H" level, vertical switches 202 connected thereto are turned ON and one of four horizontal switches 204 connected to read circuit 206 is turned ON, thereby selecting a pixel. According to this configuration, one vertical period can be divided into four such that a pixel can be selected for every four pixels in the horizontal direction. The detailed description of the operation is described in Japanese Patent Laid-open Publication No.8-105794 and Japanese Patent Laid-open Publication No.9-284651.

In the aforementioned conventional thermal infrared imaging element shown in FIG. 1 and FIG. 2, since titanium bolometer 27, ground line 24, and signal line 25 are disposed on the same substrate surface, some of a pixel area is occupied by ground line 24 and signal line 25, resulting in the problem of reducing the aperture rate (fill factor) for absorbing infrared rays.

Thus, for realizing an increased aperture rate, a thermal infrared imaging element with a three-dimensional structure is proposed in which lines such as a ground line and a signal line electrically connected to a read circuit are embedded in a layer under a diaphragm. An example of a thermal infrared imaging element with such a three-dimensional structure is hereinafter described.

FIG. 5 is a plan view of a pixel in a thermal infrared imaging element with a three-dimensional structure in which lines are embedded in a layer under a diaphragm, and FIG. 6 is a sectional view taken substantially along the lines X–X' of FIG. 5. Diaphragm 4 with air gap 2 disposed in a layer thereunder is supported by two beams 3 on Si substrate 1 provided with a read circuit. Diaphragm 4 comprises SiN insulating protective film 5, VOx bolometer material thin film 6 formed on protective film 5, SiN insulating protective film 7 formed on thin film 6 through SiO insulating protective film 8. Ti wire 11 surrounded by SiN insulating protective films 5, 7 and another insulating protective film 9 is formed to pass through two beams 3. Bolometer material thin film 6 within diaphragm 4 is connected to signal line 15 made of Al through Ti contact 12 and wire plug 13 made of tungsten, and signal line 15 is electrically connected to a read circuit within Si substrate 1. Total reflection film 14 made of Ti is disposed on a portion of a surface of Si substrate 1 provided with a read circuit that faces air gap 2.

In the thermal infrared imaging element, when infrared rays 10 are incident on diaphragm 4, the incident infrared rays are absorbed by SiN insulating protective film 5. Some of the infrared ray which cannot be absorbed by SiN insulating protective film 5 is reflected by total reflection film 14 toward diaphragm 4, and the reflected infrared rays are again absorbed by SiN insulating protective film 5. Since the line electrically connected to the read circuit is embedded in a layer under diaphragm 4, a pixel area is not occupied by the wire to allow an increased aperture rate for absorbing the infrared ray.

When the wire is embedded in the layer under the diaphragm as described above, a contact is typically provided for connecting each wire embedded in the lower layer to the bolometer in the diaphragm portion. FIG. 7 schematically shows a pixel arrangement and a positional relationship of contacts in a thermal infrared imaging element with wires embedded in a layer under a diaphragm. Ti contact 12A is a contact connected to a vertical signal line, and Ti contact 12B is a contact connected to a drain of a vertical switch constituting part of a pixel. In this configuration, the aperture rate can be further increased by reducing the size of each Ti contact and reducing a margin of the interval (interval between Ti contact 12A and Ti contact 12B in the lower right pixel) between Ti contacts in adjacent pixels.

However, it has been found from various analysis results previously made that an attempt to increase the aperture rate as described above develops pixel defects due to a contact short which causes deteriorated image quality. For example, in the pixel arrangement shown in FIG. 7, a reduced margin of the interval between Ti contacts produces a short in Ti contacts in adjacent pixels due to etching residues caused by the process, which deteriorates image quality. The problem of the contact short is described in detail next.

In the imaging element with the circuit configuration shown in FIG. 3, since one vertical period is divided into four such that a pixel is selected for every four pixels in the horizontal direction, more than one switches of four horizontal switches connected to one read circuit are not selected simultaneously. If a contact short occurs, however, a bias current to a bolometer also flows to an adjacent line through the short path.

FIG. 8 is a schematic diagram showing an example of a pixel arrangement in which a contact short occurs, FIG. 9 is a schematic circuit diagram including the contact short, and FIG. 10 is a schematic diagram showing resistance distribution including the contact short. In FIG. 8, each contact connected to a vertical signal line is represented as "S," and each contact connected to a drain of a vertical switch is represented as "D." FIG. 8 shows a state where a short occurs in S contact at row b and column 2 (hereinafter represented as [b,2]) and D contact at [c,3]. FIG. 9 illustrates the contact short shown in FIG. 8 in a circuit diagram, and FIG. 10 shows distribution of resistances of bolometers when the short path shown in FIG. 8 is produced. FIGS. 11a to 11c schematically show paths for flowing bias currents when the contact short shown in FIGS. 8 to 10 occurs. FIG. 11a shows a path for flowing a bias current when pixel [a,2] in FIG. 10 is selected, from which it can be seen that a bolometer resistance value is 2R/3. FIG. 11b shows a path for flowing a bias current when pixel [c,2] in FIG. 10 is selected, from which it can be seen that a short occurs. FIG. 11c shows a path for flowing a bias current when pixel [c,3] in FIG. 10 is selected, from which it can be seen that a bolometer resistance value is R.

In the thermal infrared imaging element, typically, variations in bolometer resistance values (unevenness) limit the dynamic range of the read circuit and produce variations in sensitivity of the imaging element. Thus, smaller variations (unevenness) are preferable in the bolometer resistance values. Evaluations in previously published papers show that variations (unevenness) in the bolometer resistance values are typically approximately 10% p-p with respect to the central resistance value, and a pixel with a resistance value above the range is a defective pixel. In the aforementioned three-dimensional configuration, assuming that the bolometer resistance value is R, the bolometer resistance value appears to be 2R/3 in two lines in the vertical direction where a contact short occurs, as shown in FIG. 10. This corresponds to −33% if converted into variations in resistance (unevenness), and the pixels with the two lines serve as defective pixels.

In this manner, a contact short at one point affects two lines in the vertical direction. For example, in an array of 320 by 240 in horizontal and vertical directions, respectively, if a contact short occurs at one point, the number of defects amounts to 480 pixels multiplied by 2 lines by 240 pixels, representing a deteriorated pixel defective rate. In addition, defective pixels due to such a contact short are produced regularly in two lines in the vertical direction, and are extremely prominent as linear flaws when imaging is performed, resulting in significantly deteriorated good item yields.

From the aforementioned reasons, in the imaging element with the three-dimensional configuration, a serious problem is how to eliminate deteriorated image quality due to a contact short for increasing the aperture rate. In addition, the problem of the deteriorated image quality due to a contact short described above occurs not only in the thermal infrared imaging element but also in general semiconductor devices including the aforementioned infrared display, ultrasonic sensor and the like.

SUMMARY OF THE INVENTION

It is an object of the present invention to provide a semiconductor device and a trimming method which can reduce the effect of defective pixels caused by the aforementioned contact short. It is another object of the present invention to provide a recording medium which records a program for executing the trimming.

To achieve the aforementioned objects, the semiconductor device of the present invention comprises thin film resistors arranged in two-dimensional form corresponding to pixels for converting incoming infrared rays into electrical signals or for emitting infrared rays, and selecting means for selecting an arbitrary thin film resistor to supply an overcurrent to the selected thin film resist.

The semiconductor device of the present invention comprises thin film resistors arranged in two-dimensional form corresponding to pixels for converting incoming infrared rays into electrical signals or for emitting infrared rays, wherein the thin film resistors are connected to a vertical signal line for each column and each of the thin film resistors is provided with a semiconductor switch, each of the pixels includes a first contact connected to the vertical signal line and a second contact connected to a drain of the semiconductor switch, and the first contact is disposed close to the second contact in adjacent pixels in the column direction.

The semiconductor device of the present invention comprises thin film resistors arranged in two-dimensional form corresponding to pixels for converting incoming infrared rays into electrical signals or for emitting infrared rays, wherein the thin film resistors are connected to a vertical signal line for each column and each of the thin film resistors is provided with a semiconductor switch, each of the pixels includes a first contact connected to the vertical signal line and a second contact connected to a drain of the semiconductor switch, and either the first contacts or the second contacts are disposed close to each other in adjacent pixels in the column direction. In this case, the first contact may be used in common for adjacent pixels in the column direction.

The trimming method of the present invention for a semiconductor device comprising thin film resistors arranged in two-dimensional form corresponding to pixels for converting incoming infrared rays into electrical signals or for emitting infrared rays comprises the step of flowing an overcurrent to desired thin film resistors.

The recording medium of the present invention records a program for causing a computer to execute the processing of:

sequentially selecting pixels in a semiconductor device comprising thin film resistors arranged in two-dimensional form corresponding to pixels for converting incoming infrared rays into electrical signals or for emitting infrared rays;

measuring resistance values of the thin film resistors of the selected pixels;

detecting a pixel with a resistance value deviating from a predefined value based on the measuring results; and flowing an overcurrent to a thin film resistor in a predetermined pixel adjacent to the detected pixel.

In the present invention as described above, the following effects are provided.

As described in the aforementioned problem, when a contact short occurs in a pixel to be supplied with a bias current and a pixel adjacent thereto, the bias current also flows to an adjacent line through the short path to cause defective pixels in two lines in the vertical direction where the contact short occurs. According to the present invention, an overcurrent is supplied to a thin film resistor (bolometer) in the adjacent pixel where the contact short occurs. The thin film resistor (bolometer) supplied with the overcurrent is burnt by excessive self-heating, resulting in the elimination of the short path.

In an aspect of the present invention in which the first contact is disposed close to the second contact in adjacent pixels in the column direction, even when a contact short occurs, only the resistance value in the pixel including the second contact represents a short state and the effect is not produced on two lines in the vertical direction.

In an aspect of the present invention in which either first contacts or second contacts are disposed close to each other in adjacent pixels in the column direction, when a short occurs in the second contacts, its effect is produced only in the two pixels where the contact short occurs and the effect is not caused on two lines in the vertical direction. On the other hand, when a short occurs in the first contacts, the contact short causes no effect since they are connected to the same vertical signal line. In this configuration, in an aspect in which one of the contacts is used in common for adjacent pixels, the aperture rate and integration degree are further increased since wiring is also used in common.

The above and other objects, features, and advantages of the present invention will become apparent from the following description with reference to the accompanying drawings which illustrate examples of the present invention.

BRIEF DESCRIPTION OF THE DRAWINGS

In the accompanying drawings:

FIG. 19 is a schematic diagram showing resistance distribution in the circuit shown in FIG. 18;

FIG. 20 is a schematic diagram showing a pixel arrangement in a thermal infrared imaging element which is a third embodiment of the semiconductor device of the present invention;

DESCRIPTION OF THE PREFERRED EMBODIMENTS

Next, embodiments of the present invention are described with reference to the drawings.

Figure 5:
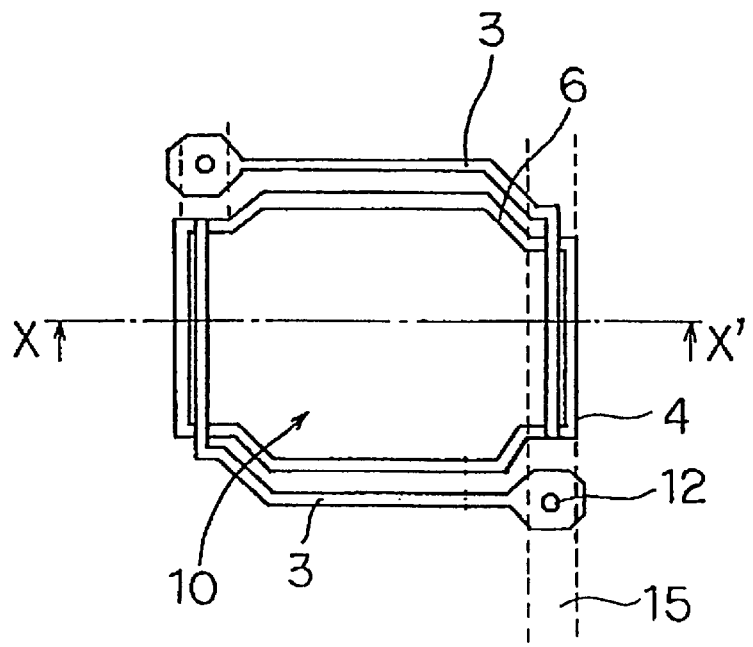
FIG. 5 is a plan view showing an example of a pixel of a thermal infrared imaging element with a three-dimensional configuration in which wires are embedded in a layer under a diaphragm.
Figure 6:
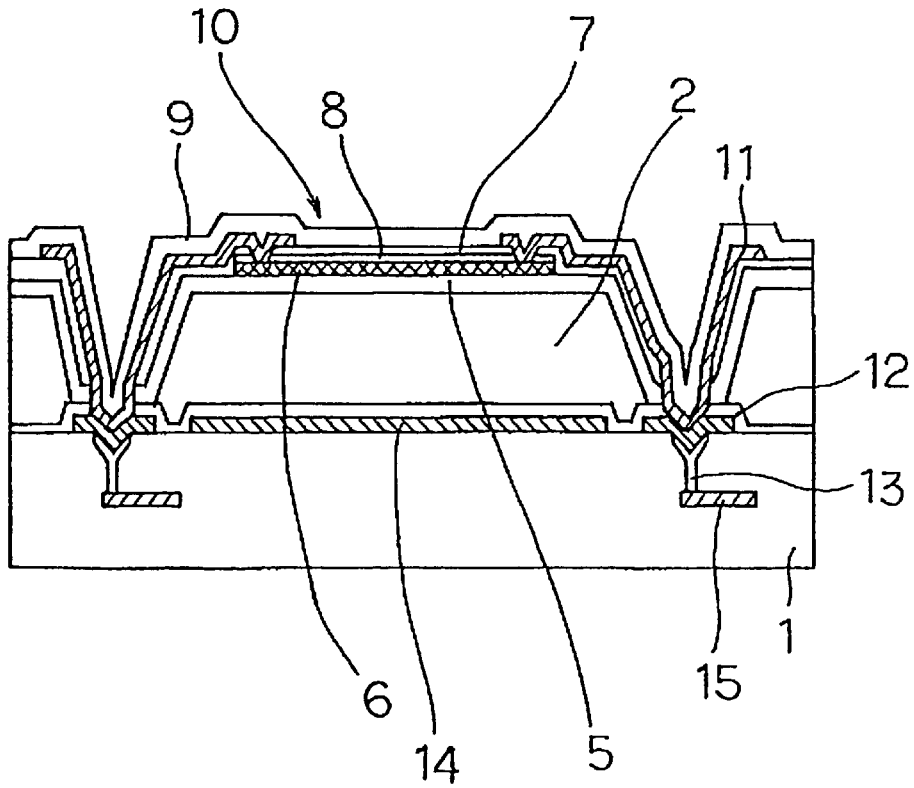
FIG. 6 is a sectional view taken along X–X' in the pixel shown in FIG. 5.

A semiconductor device of the present invention includes thin film resistors made of bolometer materials arranged in two-dimensional form corresponding to respective pixels, and represents a three-dimensional configuration as shown in FIGS. 5 and 6 mentioned above. The configuration and operation of the semiconductor device of the present invention are specifically described hereinafter with a thermal infrared imaging element and an infrared display element as examples. (Embodiment 1: Thermal Infrared Imaging Element)

Figure 7:
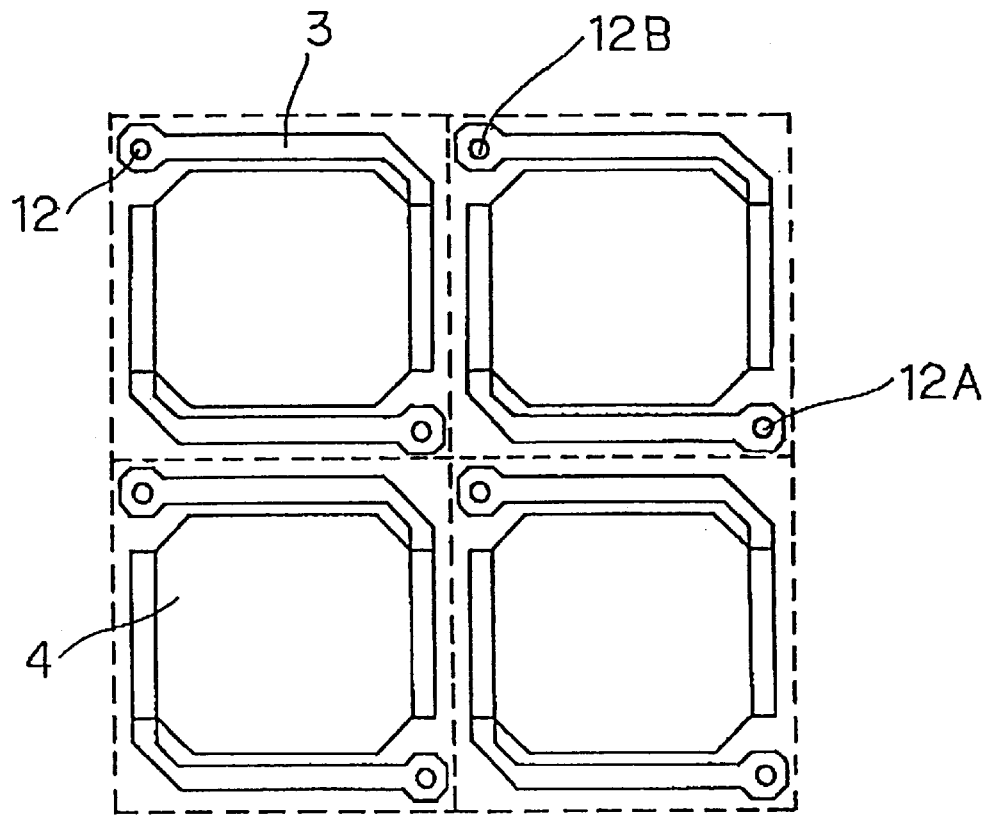
FIG. 7 is a schematic diagram showing an example of a pixel arrangement and a positional relationship of contacts in a thermal infrared imaging element in which wires are embedded in a layer under a diaphragm.
Figure 12:
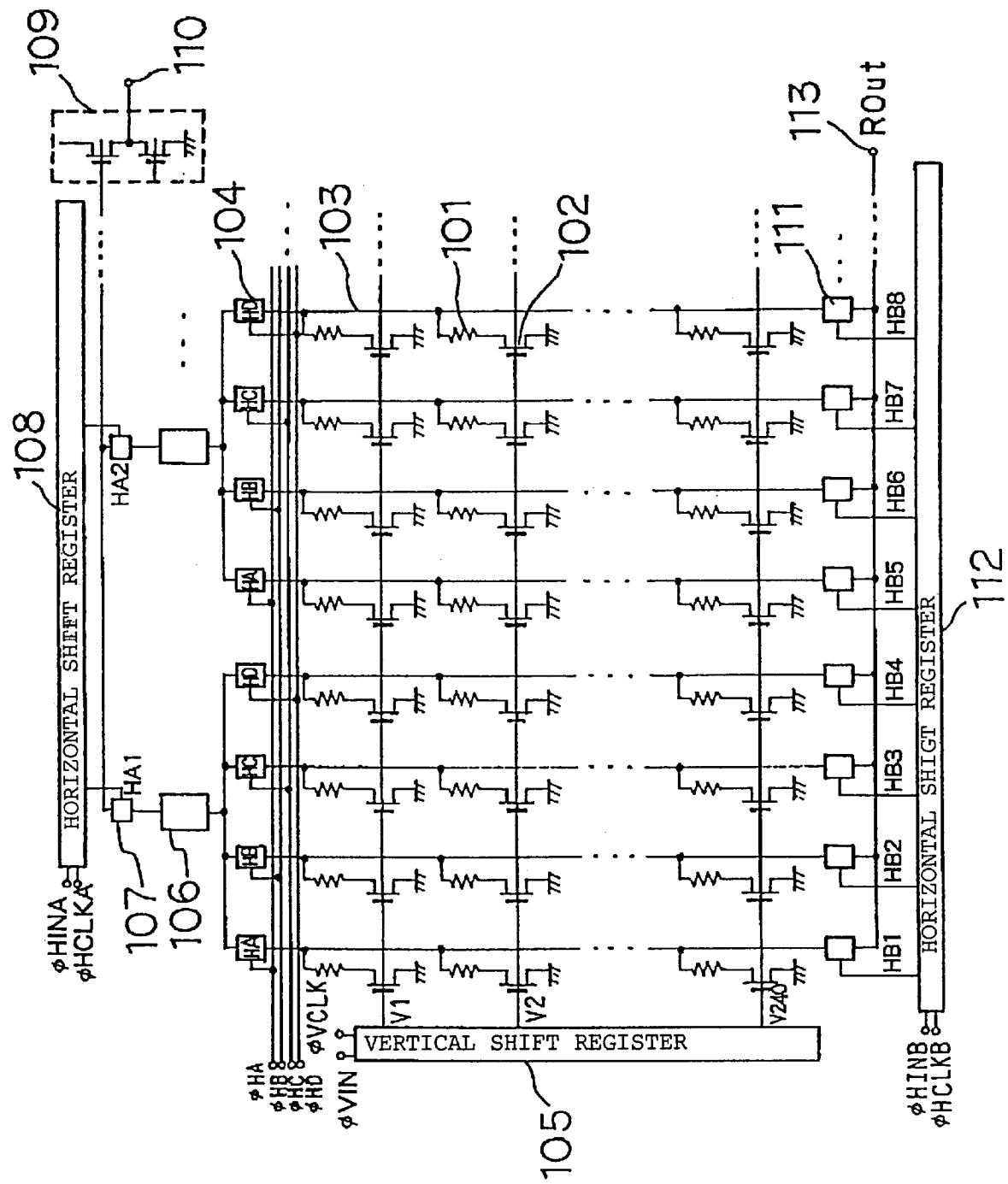
FIG. 12 is a circuit diagram showing a thermal infrared imaging element which is a first embodiment of a semiconductor device of the present invention.

FIG. 12 is a circuit diagram of a thermal infrared imaging element which is a first embodiment of the semiconductor device of the present invention. In the thermal infrared imaging element, bolometer 101 and vertical switch 102 constitute a pixel. Each pixel is configured as shown in FIGS. 5 and 6 mentioned above, and converts the incident infrared rays into heat. As a pixel arrangement, various pixel arrangements are applicable in addition to the pixel arrangement shown in FIG. 7 mentioned above.

Bolometer 101 is connected to vertical signal line 103 and further to horizontal switch 104. Horizontal switch 104 is selected with control pulses φHA to φHD. Four horizontal switches 104 are connected to one read circuit 106 such that outputs from read circuits 106 are sequentially provided to the outside through multiplexers 107 and output buffer 109. Read circuit 106 can be formed of an integrating circuit, a sample hold circuit or the like. A pixel is selected in timing such that while an output (for example, V1) from vertical shift register 105 is at "H" level, vertical switches 102 connected thereto are turned ON and one of four horizontal switches 104 connected to read circuit 106 is turned ON. With this pixel selection, one vertical period is divided into four and a pixel is selected every four pixels in the horizontal direction.

Figure 8:
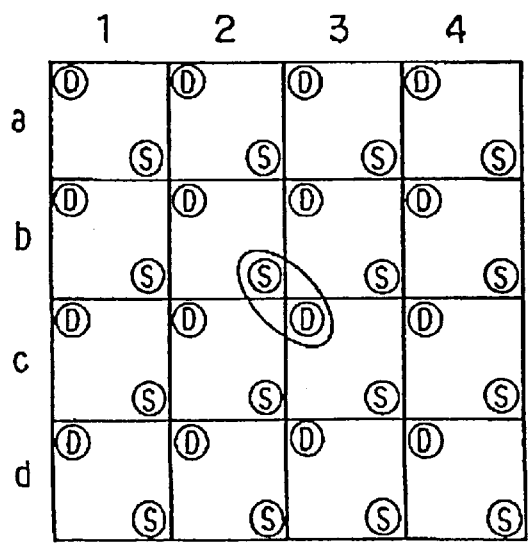
FIG. 8 is a schematic diagram showing the pixel arrangement in the thermal infrared imaging element shown in FIG. 7.

In the aforementioned configuration, when the size of each contact is reduced and each interval margin between contacts in adjacent pixels is reduced for increasing the aperture rate, a contact short occurs in adjacent pixels as described above. When such a contact short occurs in adjacent pixels, a bias current to a bolometer also flows to an adjacent line through the short path to cause the bolometer resistance value to appear to be 2R/3 in two lines in the vertical direction where the contact short occurs, resulting in defective pixels (see FIGS. 8 to 10). The defective pixels can be restored by burning the adjacent pixel in which the contact short occurs.

Thus, in the configuration shown in FIG. 12, each vertical signal line 103 is connected to horizontal shift register 112 through each horizontal switch 111 such that an arbitrary single pixel can be directly accessed with φHINB which is a data input signal for horizontal shift register 112 and φHCLK which is a clock signal. This configuration enables selection of a desired pixel and a predetermined amount of current to flow to a bolometer of the selected defective pixel.

The current is supplied to the bolometer of the selected pixel by an external power circuit connected to Rout 113.

When horizontal switch 111 is used, horizontal switch 104 is turned OFF to hold read circuit 106 in a disconnected state. In contrast, when horizontal switch 104 is used to produce an output from read circuit 106 to the outside, horizontal switch 111 is held in a disconnected state.

Figures 13, 14:
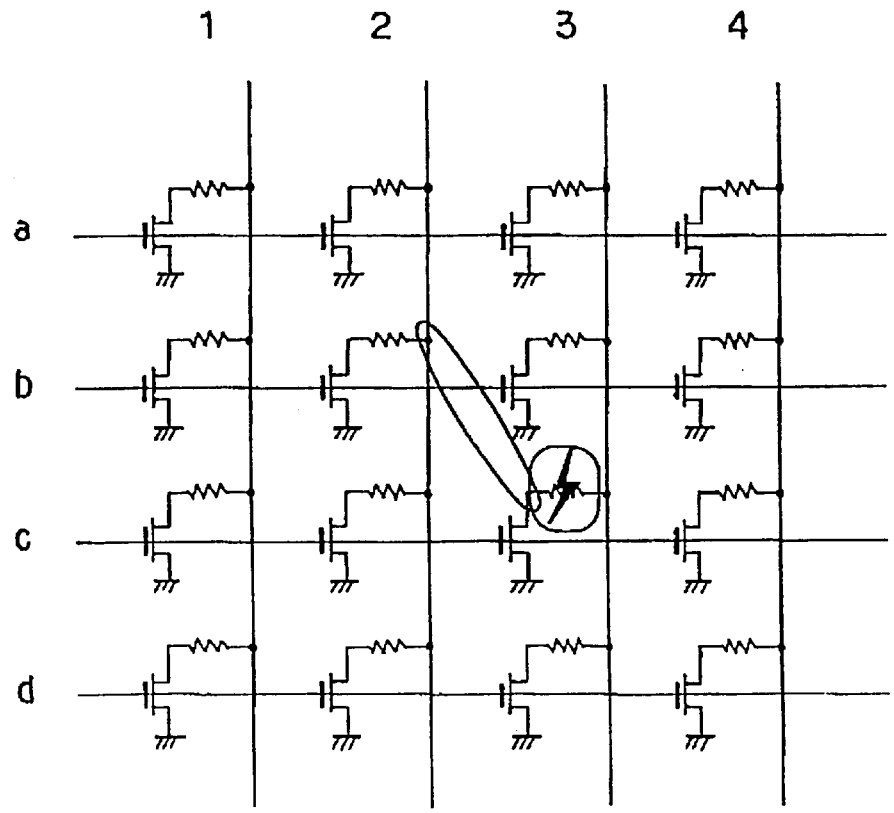
FIG. 13 is a schematic circuit diagram for describing trimming for the contact short shown in FIG. 8 to FIG. 10.
FIG. 14 is a schematic diagram showing resistance distribution after the trimming shown in FIG. 13.

Next, description is made for a trimming technique for restoring a defective pixel caused by a contact short in adjacent pixels. FIG. 13 is a schematic circuit diagram illustrating an example of a contact short. FIG. 14 is a schematic diagram showing resistance distribution after the trimming.

A bolometer can be typically burnt down itself by flowing an overcurrent in a vacuum to cause excessive self-heating of the bolometer. Actually, beams for supporting a diaphragm may be burnt and broken. Assuming that the temperature(approximately several hundreds of degrees centigrade actually) at which a bolometer is burnt with self-heating is T (° C.), applied voltage VD (V) can be represented as follows:

$$VD=(T \times R \times Gth)^{1/2}$$

where R (Ω) represents a bolometer resistance value, and Gth (W/K) represents a heat conductance in a vacuum.

If T=500° C., R=10 kΩ, and Gth=0.2μ W/K, then VD=1V.

Figure 11:
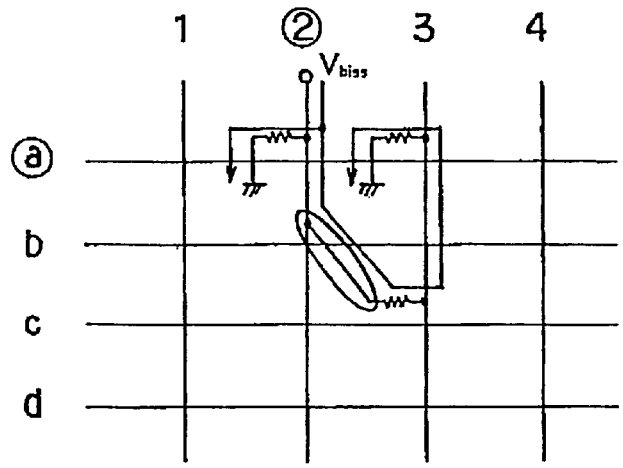
FIG. 11(a) is a schematic circuit diagram showing in detail a path for flowing a bias current when pixel [a,2] in FIG. 10 is selected.
FIG. 11(b) is a schematic circuit diagram showing in detail a path for flowing a bias current when pixel [c,2] in FIG. 10 is selected.
FIG. 11(c) is a schematic circuit diagram showing in detail a path for flowing a bias current when pixel [c,3] in FIG. 10 is selected.
Figure 11:
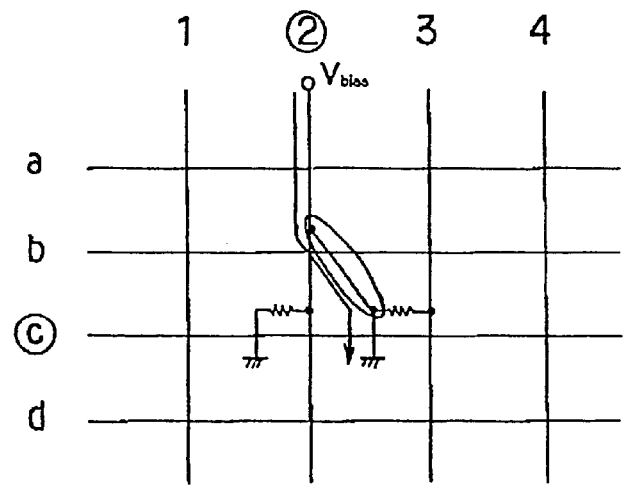
Figure 11:
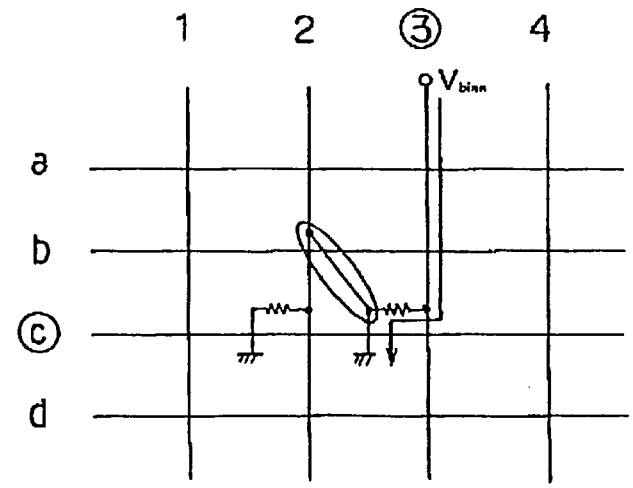

Referring to FIG. 11a mentioned above for description, the resistance value is 2R/3 in the two lines in the vertical direction where the contact short occurs because a bias current flows to the 3rd line of the vertical signal lines through the bolometer at [c,3] from the short path. In this case, vertical shift register 105, horizontal switch 11 and horizontal shift register 112 are used to select the pixel on the right of the shorted pixel, i.e. the pixel including the contact connected to the drain of vertical switch 102 (the pixel immediately to the right of the shorted pixel in the resistance distribution in FIG. 10) for burning down the bolometer itself by flowing an overcurrent in a vacuum through Rout 113 (see FIG. 13), thereby making it possible to eliminate the current path caused by the contact short. This allows the resistance value which appeared to be 2R/3 in the lines in the vertical direction to be restored to a true bolometer resistance value R (see FIG. 14), and the effect on the lines in the vertical direction can be removed.

When a contact short is physically minor, a short path itself can be burnt down by flowing a current through the short path. In this case, the effect on lines in the vertical direction can also be removed similarly to the aforementioned case.

Figures 9, 10:
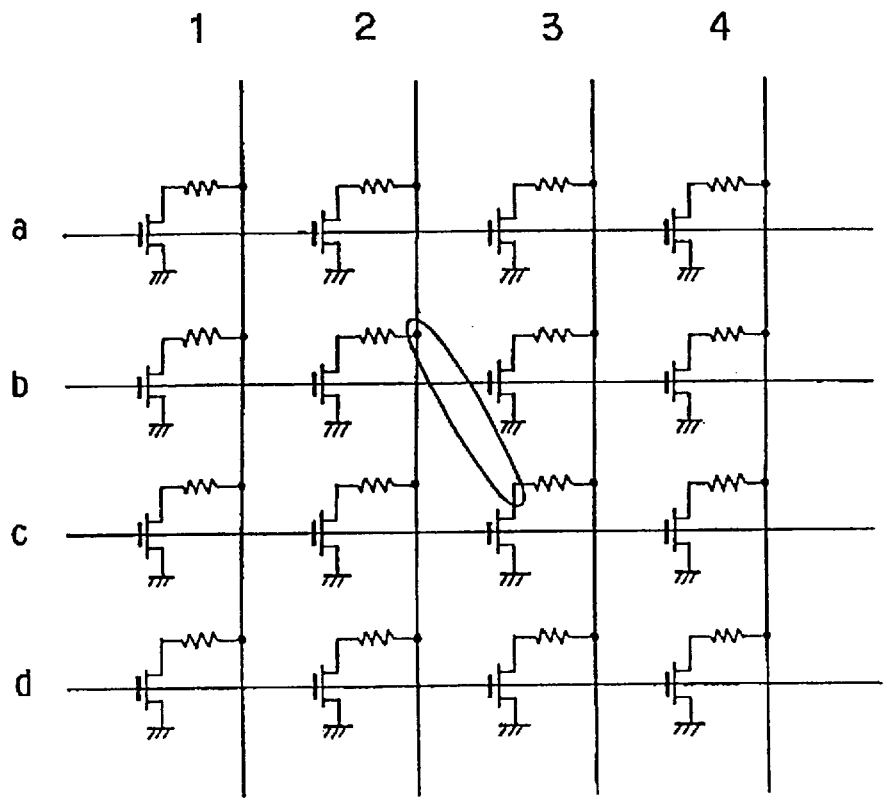
FIG. 9 is a schematic circuit diagram showing the thermal infrared imaging element shown in FIG. 7.
FIG. 10 is a schematic diagram showing resistance distribution in the thermal infrared imaging element shown in FIG. 7.

When the state of a contact short is not an obvious short but represents connection, for example at several megohms, a bolometer resistance value shows no anomaly since the effect on vertical lines corresponds to almost leak current (sub-μA). In this case, the effect on lines in the vertical direction is observed as vibration noise. However, if pixel [c,3] is selected as shown in FIG. 9, the effect of a leak path is reduced and the action of vibration noise is not observed. In such a case, the point of the contact short can be specified by searching two vertical lines for a target pixel. The specified contact short point is then subjected to the aforementioned trimming to allow the effect on lines in the vertical direction to be eliminated similarly.

The trimming technique described above is particularly effective in the following process. Specifically, in the process of measuring bolometer resistance values of all pixels in a thermal infrared imaging element with a fully automatic wafer prober or the like to select a quality item based on the resistance values, when bolometer resistance values represent 2R/3 in two lines in the vertical direction, the two lines are automatically searched for a pixel immediately to the right of a shorted pixel, and its bolometer itself is burnt down by using excessive self-heating. This enables elimination of defects in the two lines due to a contact short as well as improvements in quality item yields and productivity.

Figure 15:
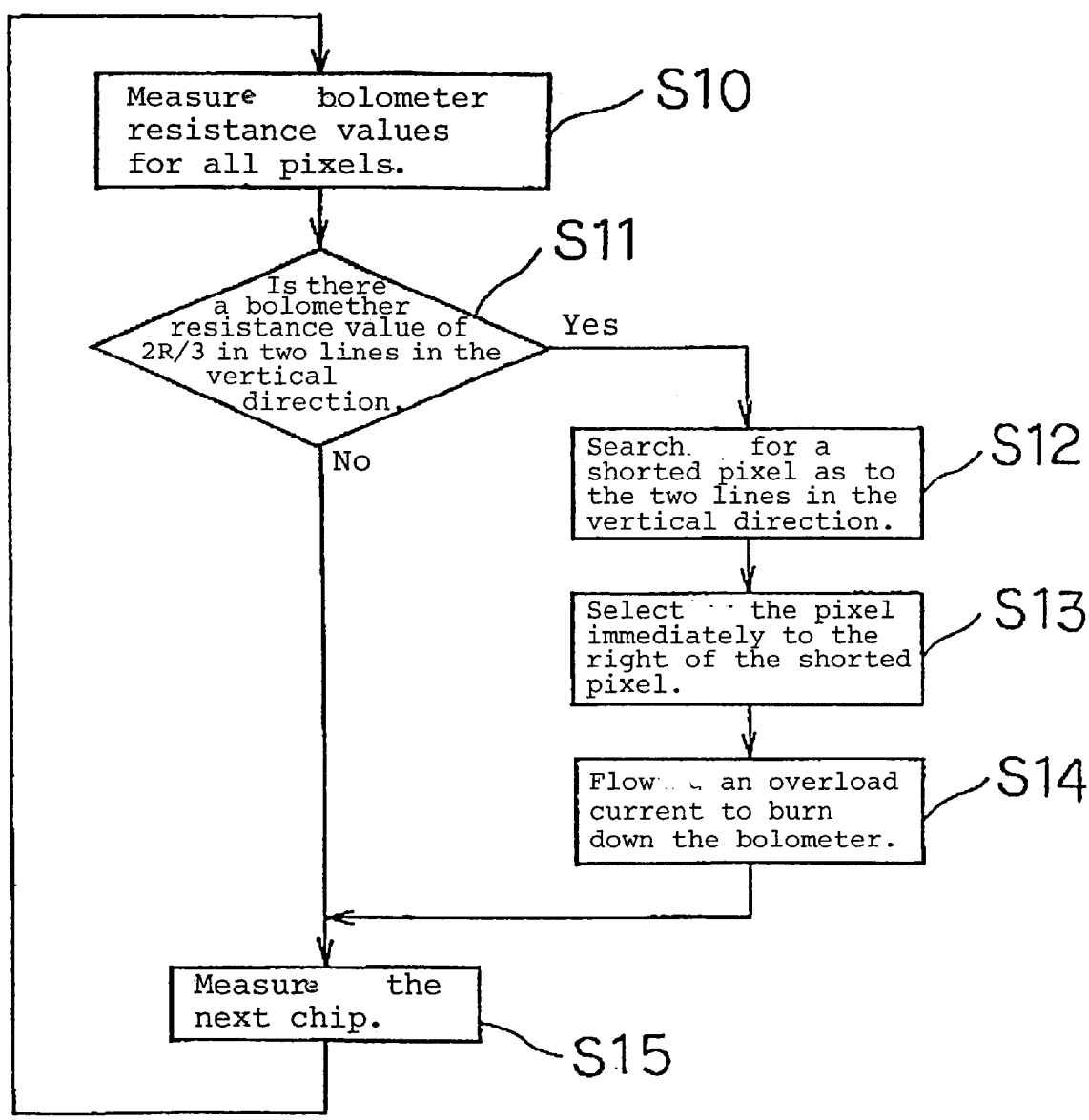
FIG. 15 is a flow chart for good item selection which employs the trimming method of the present invention.

As an example, FIG. 15 shows a flow chart for selecting quality items which employs the aforementioned trimming technique. In the quality item selection, first at step S10 bolometer resistance values are measured for all pixels of a chip. Next at step S11, a check is made to determine if a bolometer resistance value represents 2R/3 in two lines in the vertical direction. If a bolometer resistance value of 2R/3 is present, first, the two lines in the vertical direction are searched for a shorted pixel at step S12. At step S13, the pixel immediately to the right of the shorted pixel searched for is selected, and an overcurrent is flown to burn down the bolometer in the pixel at step S14. Then, the processing is moved to measurement of the next chip at step S15, and returns to the aforementioned step S10. If there is no bolometer value of 2R/3, the processing is moved directly to step S15.

Figure 16:
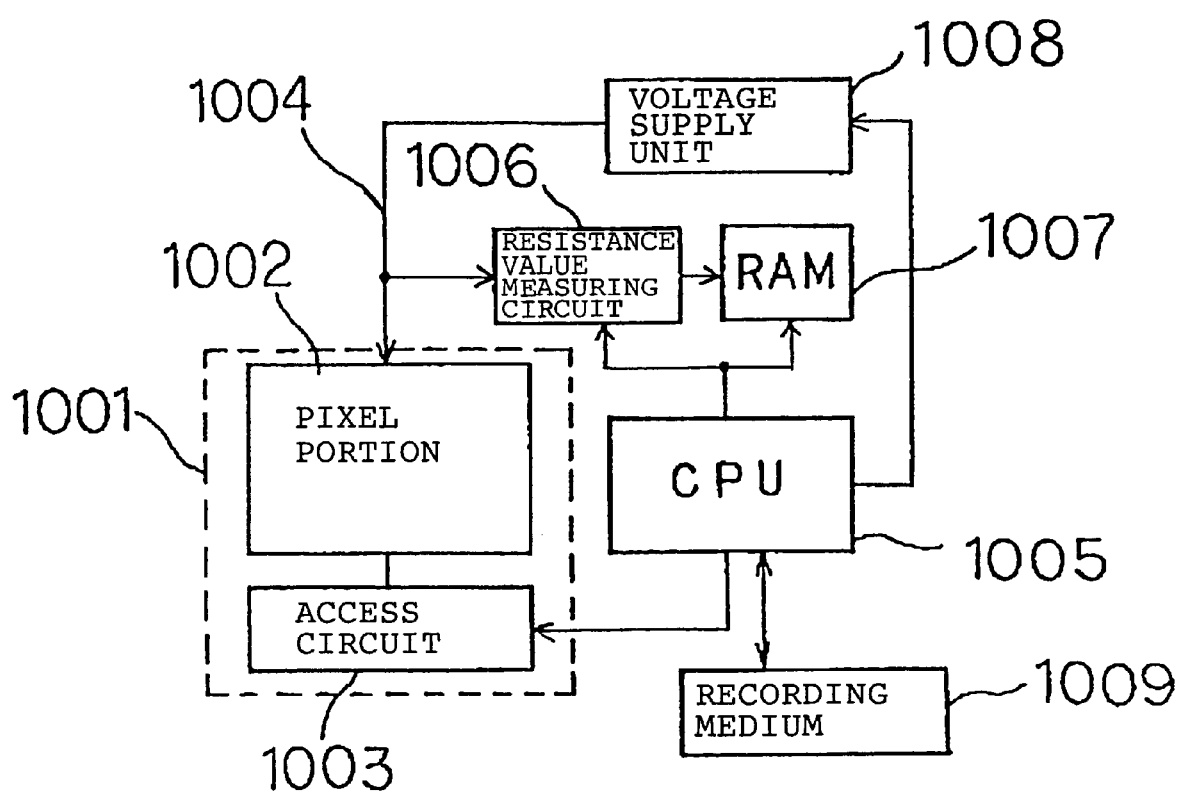
FIG. 16 is a block diagram showing an example of a trimming system.

FIG. 16 shows an example of a system for performing the aforementioned trimming. In FIG. 16, thermal infrared imaging element 1001 is the thermal infrared imaging element shown in FIG. 12 mentioned above, and comprises pixel portion 1002 in which bolometers for converting incident infrared rays into electrical signals are arranged in two-dimensional form corresponding to pixels, and access circuit 1003 for directly accessing an arbitrary single pixel in pixel portion 1002. Access circuit 1003 is formed of a shift register, a decoder and the like, and comprises vertical shift register 105, horizontal switches 111, horizontal shift register 112 and the like shown in FIG. 12.

A pixel selected by access circuit 1003 is connected to resistance value measuring circuit 1006 and voltage supply unit 1008 through signal line 1004. RAM (Random Access Memory) 1007 is provided for storing the measurement results in resistance value measuring circuit 1006. Recording medium 1009 comprises a magnetic disc, a semiconductor memory or other various types of recording media, and previously records a program which can execute the trimming procedure from steps S10 to S15 shown in FIG. 15. CPU 1005 executes trimming processing as described below in accordance with the program recorded in recording medium 1009.

First, CPU 1005 controls access circuit 1003 to sequentially select pixels in pixel portion 1002 of thermal infrared imaging element 1001, controls resistance value measuring circuit 1006 to measure the resistance values of the selected pixels, and causes the measurement results to be stored in RAM (Random Access Memory) 1007.

After the resistance values of all pixels of pixel section 1002 are measured and the results are stored in RAM 1007, CPU 1005 reads the measurement results stored in RAM 1007 to search whether any pixel has a resistance value deviating from a predefined value. If any pixel has a resistance value deviating from the predefined value, CPU 1005 controls access circuit 1003 to select the pixel immediately to the right of the pixel and controls voltage supply unit 1008 to apply a predetermined voltage to the selected pixel. This causes an overcurrent to flow through the bolometer of the pixel on the right of the pixel with the resistance value deviating from the predefined value, thereby burning down the bolometer.

In the aforementioned trimming system, as means for burning a bolometer, means for use in typical trimming such as means using a laser or an electrical beam can be applied in addition to the aforementioned means using voltage.

(Embodiment 2: Thermal Infrared Imaging Element)

Figure 17:
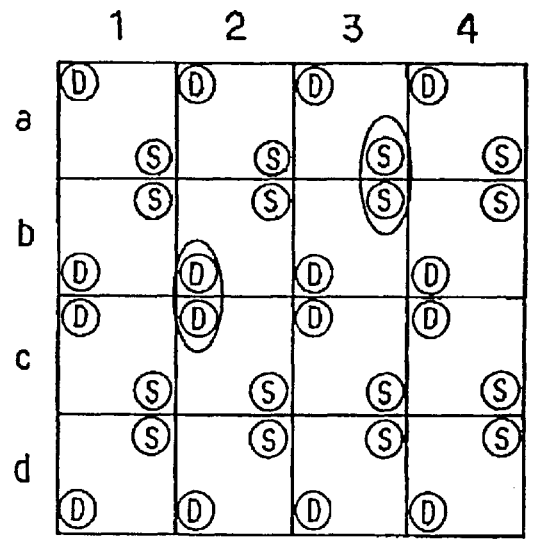
FIG. 17 is a schematic diagram showing a pixel arrangement in a thermal infrared imaging element which is a second embodiment of the semiconductor device of the present invention.

FIG. 17 is a schematic diagram showing a pixel arrangement in a thermal infrared imaging element which is a second embodiment of the semiconductor device of the present invention.

The thermal infrared imaging element of the embodiment has a configuration similar to that of the aforementioned first embodiment except for the pixel arrangement. Since the first embodiment employs the pixel arrangement shown in FIGS. 7 and 8, the occurrence of a contact short means a short in a vertical signal line and a drain of a vertical switch over two adjacent lines as shown in FIG. 9 to represent a defective mode in which a bolometer resistance value is 2R/3 in two lines in the vertical direction. In contrast, the embodiment is configured to eliminate such a defective mode by changing the pixel arrangement.

The thermal infrared imaging element of the embodiment has a configuration in which the pixel arrangement is symmetrical with respect to the X axis for each line as shown in FIG. 17. Thus, close contacts in adjacent pixels in the column direction are contacts connected to a vertical signal line, or contacts connected to drains of vertical switches. FIG. 17 shows a short of contacts for [a,3] and [b,3] connected to a vertical signal line, and a short of contacts for [b,2] and [c,2] connected to drains of vertical switches.

Figure 18:
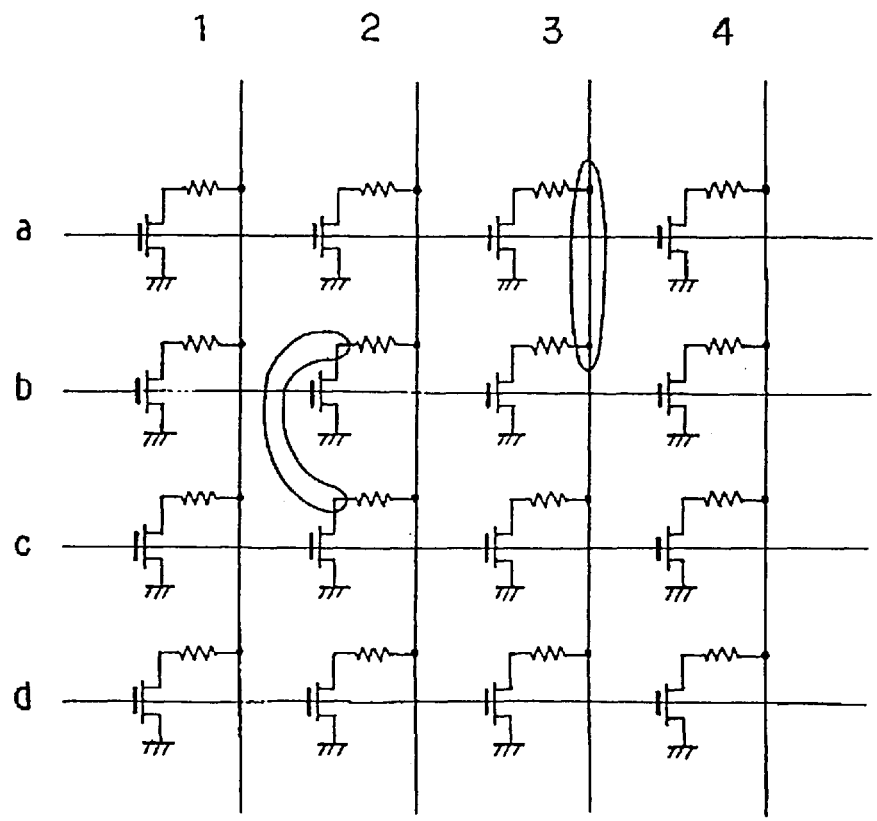
FIG. 18 is a schematic circuit diagram of the thermal infrared imaging element which is the second embodiment of the semiconductor device of the present invention.
Figures 19, 20:
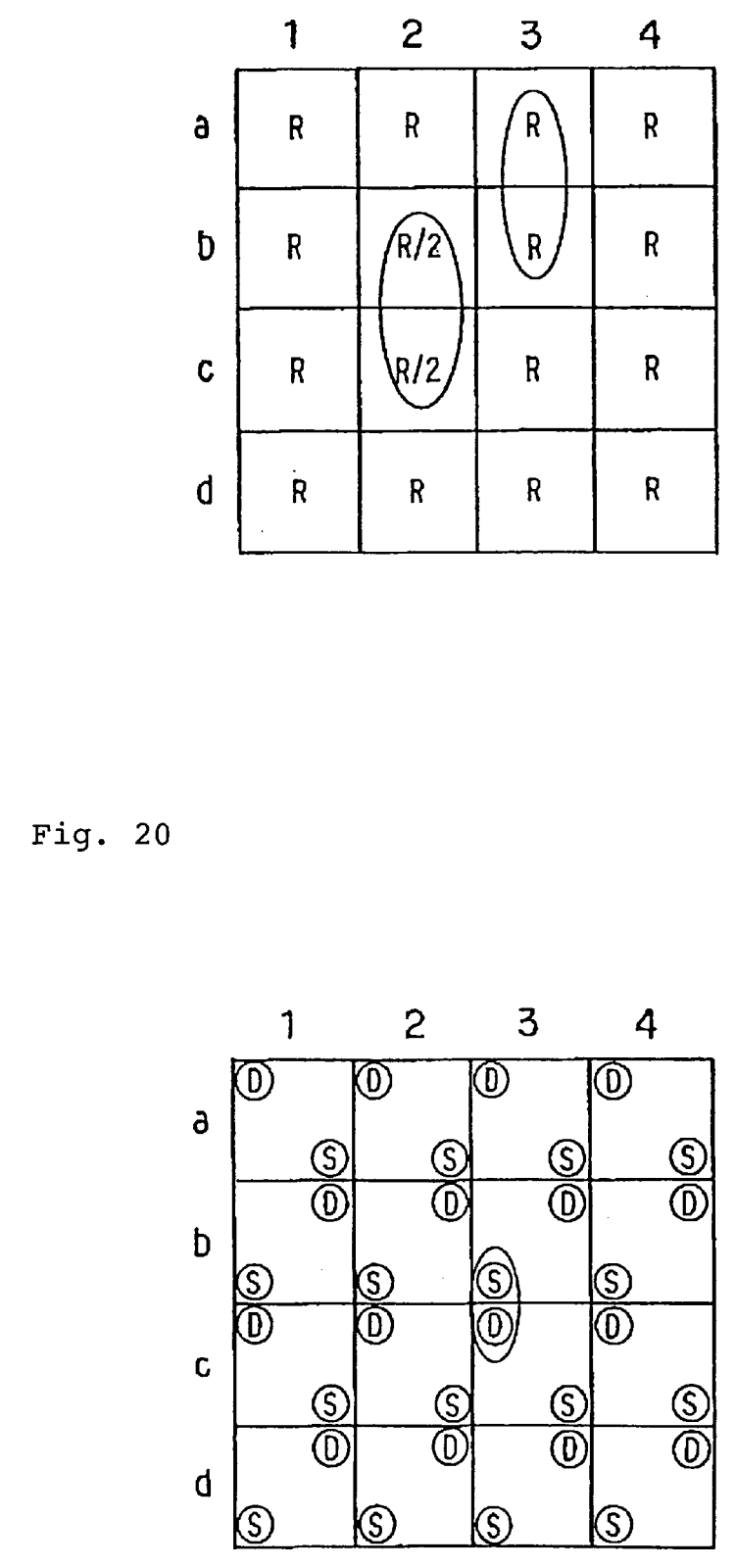

FIG. 18 is a schematic circuit diagram of the thermal infrared imaging element of the embodiment, and FIG. 19 is a schematic diagram showing resistance distribution thereof. FIG. 18 illustrates the contact shorts shown in FIG. 17 in a circuit diagram, and FIG. 19 shows resistance distribution of bolometers when short paths shown in FIG. 18 are produced.

In the thermal infrared imaging element of the embodiment, when a short occurs in the contacts for [a,3] and [b,3] connected to the vertical signal line, no effect is present since they are connected to the same vertical signal line as shown in FIGS. 18 and 19. On the other hand, when a short occurs in the contacts for [b,2] and [c,2] connected to the drains of the vertical switches, if [b,2] is selected, a bias current flows from the vertical switch for [b,2] to the ground through both bolometers for [b,2] and [c,2], and the resistance values of the bolometers in the pixels appear to be R/2. If [c,2] is selected, the resistance values also appear to be R/2.

While the aforementioned first embodiment presents the effect of a contact short at one point on two lines in the vertical direction, in the second embodiment, the effect of a contact short is seen only when a short occurs in contacts connected to drains of vertical switches. Thus, the occurrence rate becomes ½. In addition, in the second embodiment, the resistance values of two pixels where a contact short occurs are R/2, but the effect is not produced on two lines in the vertical direction.

In the aforementioned manner, the thermal infrared imaging element of the embodiment can suppress the effect of a contact short without performing the trimming described in the first embodiment.

Figure 1:
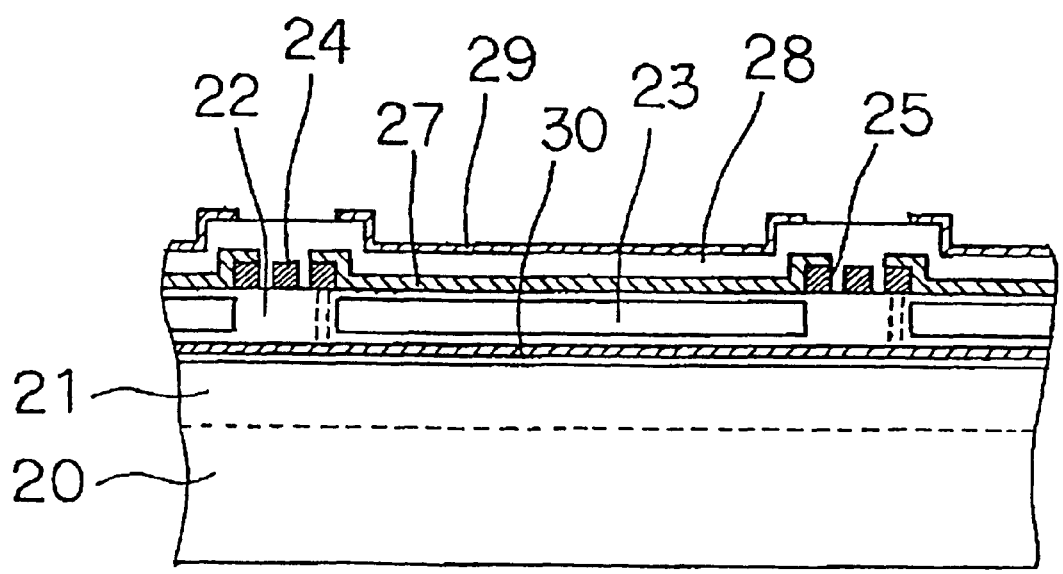
FIG. 1 is a sectional view of a pixel of a conventional thermal infrared imaging element.
Figure 2:
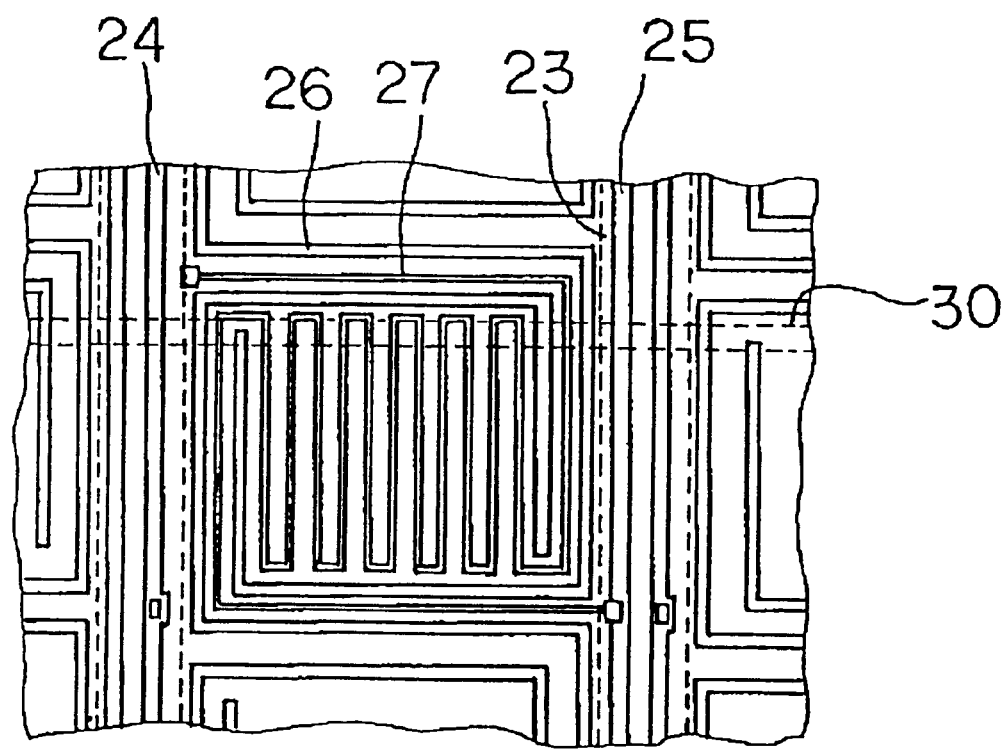
FIG. 2 is a plan view of the pixel of the conventional thermal infrared imaging element.
Figure 3:
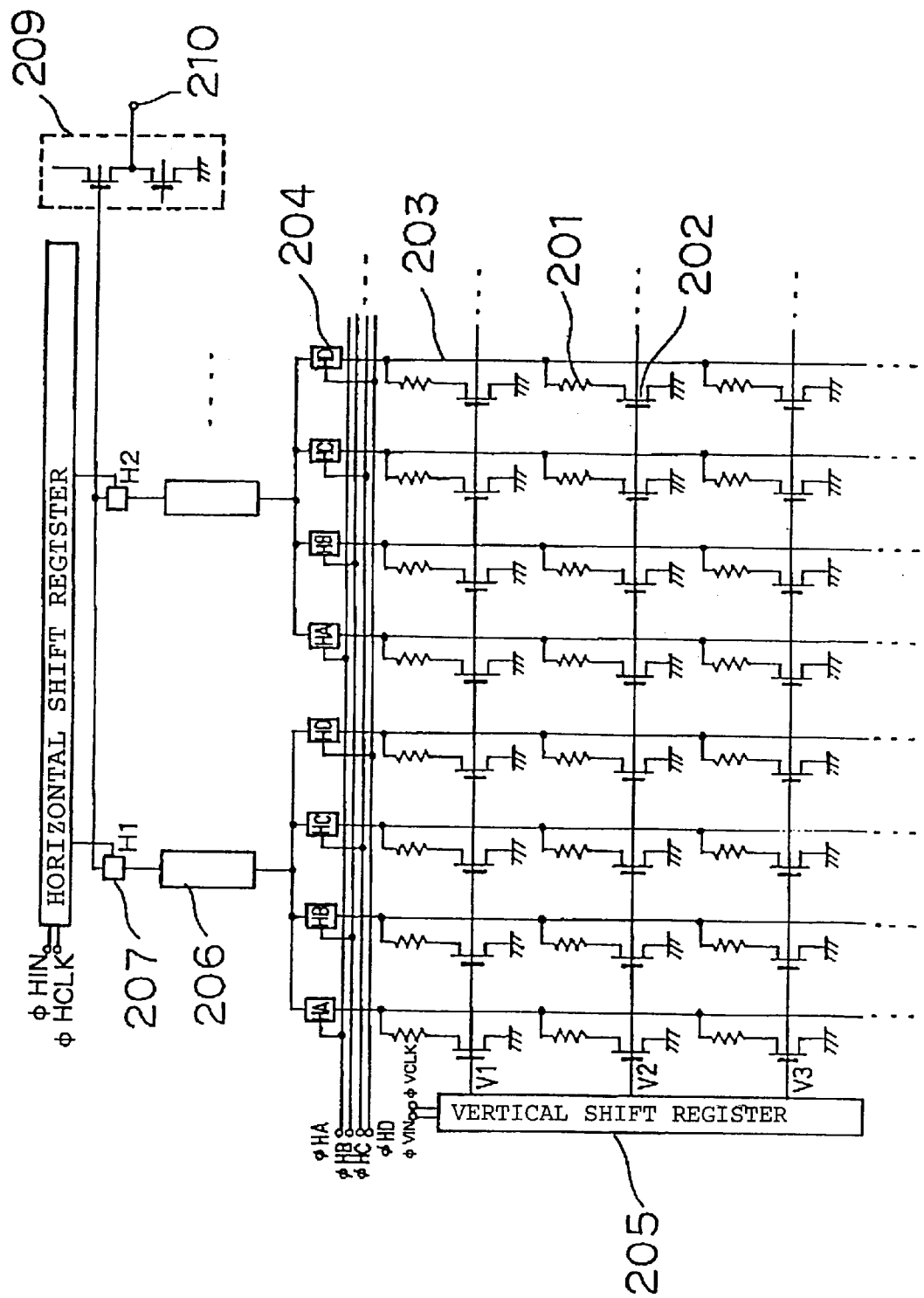
FIG. 3 is a circuit diagram of the conventional thermal infrared imaging element.
Figure 4:
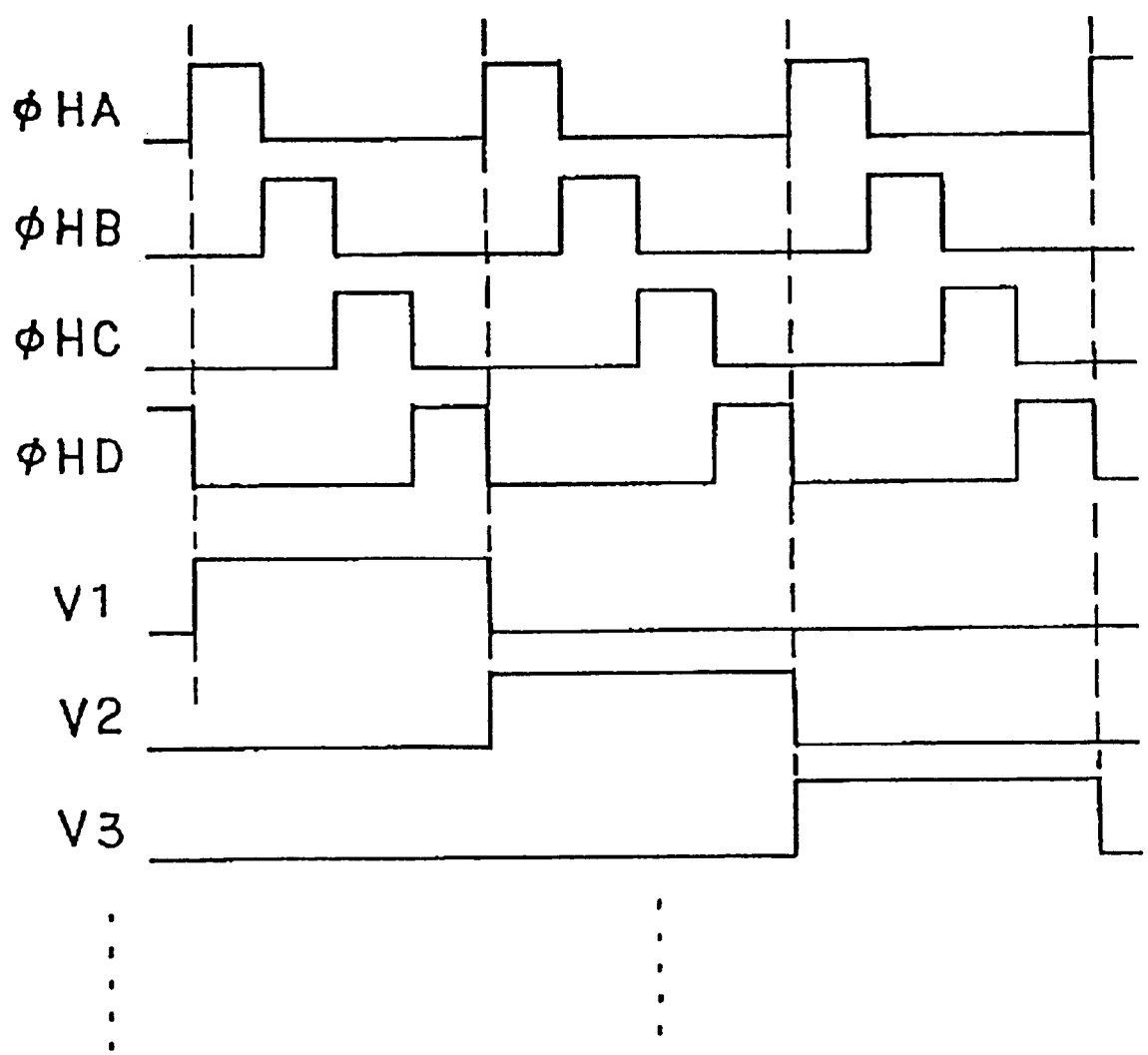
FIG. 4 is a timing chart for describing the operation of the thermal infrared imaging element shown in FIG. 3.

It should be noted that since the circuit configuration of the thermal infrared imaging element of the embodiment is similar to the configuration of the imaging element shown in FIG. 3 mentioned above, a detailed description thereof is omitted.

(Embodiment 3: Thermal Infrared Imaging Element)

FIG. 20 is a schematic diagram showing a pixel arrangement of a thermal infrared imaging element which is a third embodiment of the semiconductor device of the present invention.

The thermal infrared imaging element of the embodiment also has a configuration similar to that of the aforementioned first embodiment except for the pixel arrangement. FIG. 20 shows a state where a short occurs in a contact for [b,3] connected to a vertical signal line and a contact for [c,3] connected to a drain of a vertical switch.

Since the pixel arrangement shown in FIG. 20 is symmetrical with respect to the Y axis for each line, each S contact connected to a vertical signal line is disposed close to each D contact connected to a drain of a vertical switch in adjacent pixels in the column direction.

Figures 21, 22:
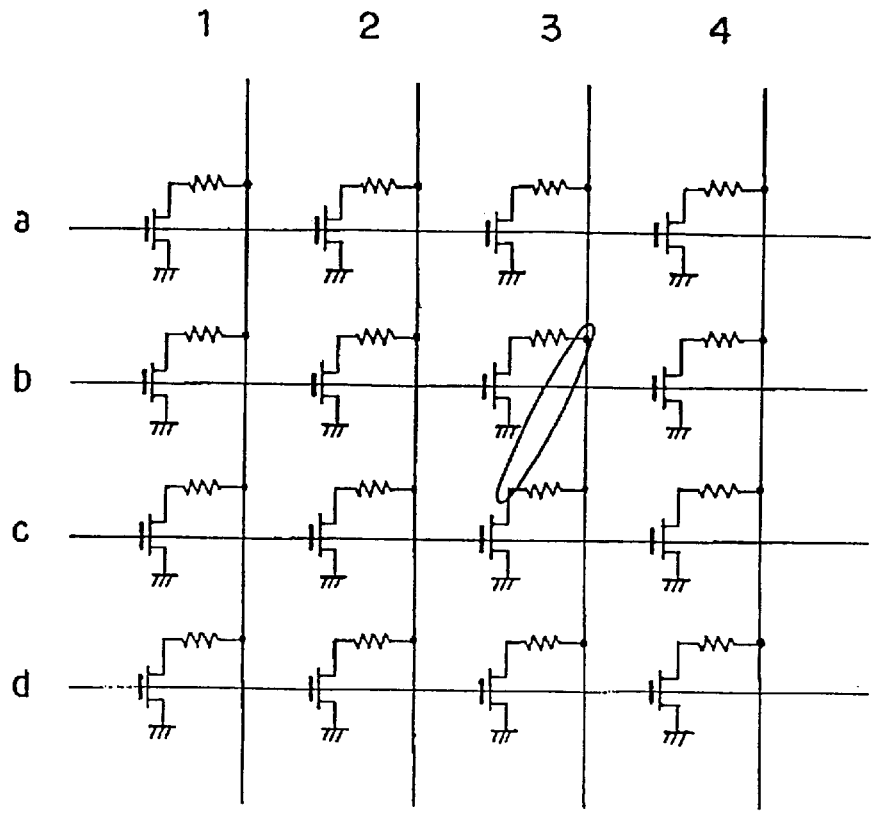
FIG. 21 is a schematic circuit diagram of the thermal infrared imaging element which is the third embodiment of the semiconductor device of the present invention.
FIG. 22 is a schematic diagram showing resistance distribution in the circuit shown in FIG. 21.

FIG. 21 is a schematic circuit diagram of the thermal infrared imaging element of the embodiment, and FIG. 22 is a schematic diagram showing resistance distribution thereof. FIG. 21 illustrates the contact short shown in FIG. 20 in a circuit diagram, and FIG. 22 shows resistance distribution of bolometers when a short path shown in FIG. 21 is produced.

In the thermal infrared imaging element of the embodiment, when a contact short occurs, the resistance value of a pixel including a contact connected to a drain of a vertical switch represents a short state, but its effect is not produced on two lines in the vertical direction, as shown in FIGS. 21 and 22. Thus, the embodiment can also suppress the effect of a contact short without performing the trimming described in the aforementioned first embodiment.

The circuit configuration of the thermal infrared imaging element of the embodiment is similar to the configuration of the imaging element shown in FIG. 3 mentioned above; therefore, a detailed description thereof is omitted.

Figure 23:
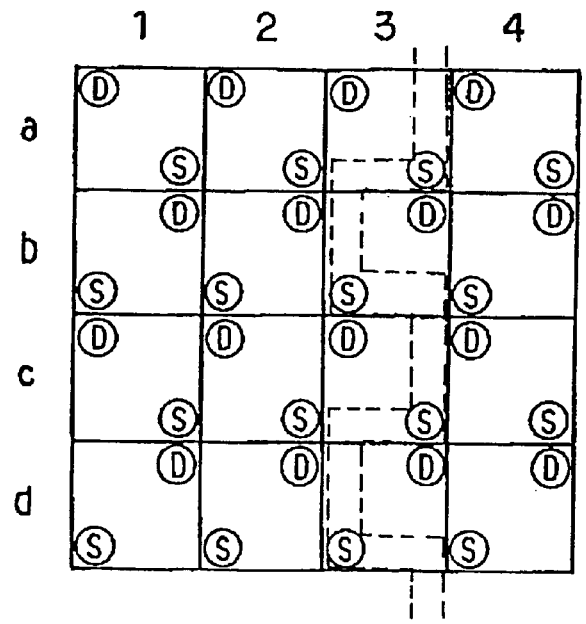
FIG. 23 is a diagram showing an example of a wiring pattern of a vertical signal line in the circuit shown in FIG. 21.

In the case of the pixel arrangement of the thermal infrared imaging element of the embodiment, a turned wiring pattern is provided for the vertical signal line as shown in FIG. 23. In contrast, in the arrangement of the aforementioned second embodiment, since the contacts connected to the vertical signal line are linearly arranged as shown in FIG. 17, a simple linear wiring pattern can be provided. Thus, it can be said that the pixel arrangement shown in the second embodiment is more preferable in consideration of the wiring pattern.

(Embodiment 4: Thermal Infrared Imaging Element)

Figure 24:
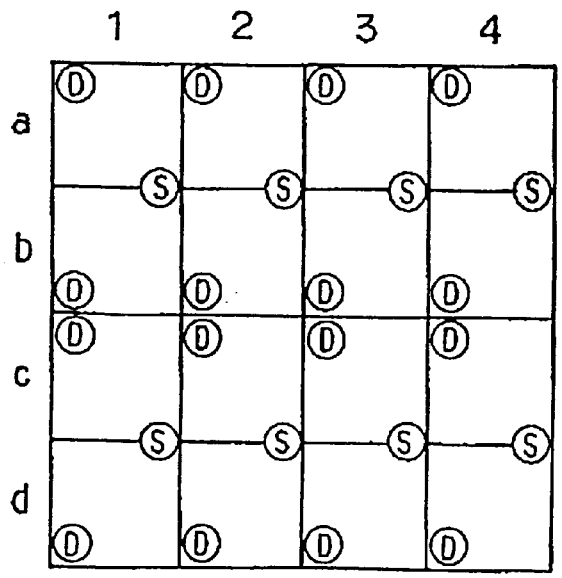
FIG. 24 is a schematic diagram showing a pixel arrangement in a thermal infrared imaging element which is a fourth embodiment of the semiconductor device of the present invention.

FIG. 24 is a schematic diagram showing a pixel arrangement of a thermal infrared imaging element which is a fourth embodiment of the semiconductor device of the present invention.

The thermal infrared imaging element of the embodiment also has a configuration similar to that of the aforementioned first embodiment except for the pixel arrangement. Since the pixel arrangement is symmetrical with respect to the X axis for each line as shown in FIG. 24, close contacts in adjacent pixels in the column direction are contacts connected to a vertical signal line in two pixels in the vertical direction, or contacts connected to drains of vertical switches. Since contacts in two pixels in the vertical direction are connected to a common vertical signal line, a contact can be used in common therefor. In an example shown in FIG. 24, a contact (represented as "S" in FIG. 24) connected to a vertical signal line is used in common for two pixels. This enables improvements in the aperture rate and performance.

The circuit configuration of the thermal infrared imaging element of the embodiment is also similar to the configuration of the imaging element shown in FIG. 3 mentioned above; therefore, a detailed description thereof is omitted.

(Embodiment 5: Infrared Display Element)

Figure 25:
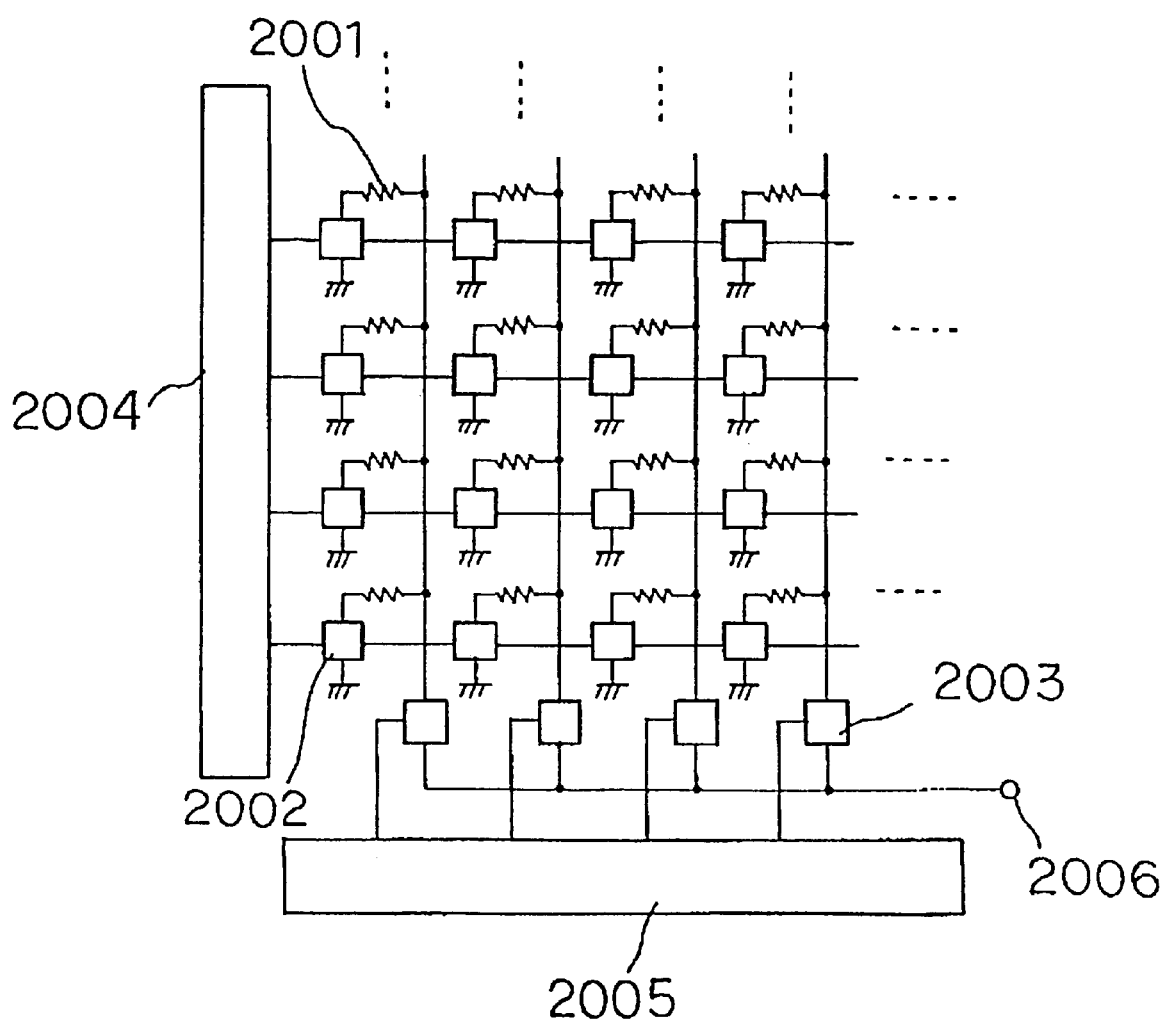
FIG. 25 is a circuit diagram showing an example of a configuration of an infrared display element which is a fifth embodiment of the semiconductor device of the present invention.

FIG. 25 is a circuit diagram showing an example of a configuration of an infrared display element which is a fifth embodiment of the semiconductor device of the present invention.

In FIG. 25, each of resistors 2001 is a thin film resistor formed of a bolometer, a piezoresistor or the like, and resistors 2001 are arranged in two-dimensional form corresponding to pixels. Each resistor 2001 is connected to vertical shift register 2004 through vertical switch 2002 and to a vertical signal line for each column, and each vertical signal line is connected to horizontal shift register 2005 through horizontal switch 2003. Each vertical signal line can be provided with a bias current or a bias voltage from signal line 2006 through horizontal switch 2003.

In the infrared display element, vertical shift register 2004 and horizontal shift register 2005 are driven by an external driving circuit, pixels are sequentially selected with vertical switches 2002 and horizontal switches 2003, and resistor 2001 of the selected pixel is provided with a predetermined amount of bias current or bias voltage from signal line 2006. Resistor 2001 supplied with the predetermined amount of bias current or bias voltage outputs infrared rays,(emits light) in accordance with the bias current or bias voltage.

The infrared display element of the embodiment employs the aforementioned three-dimensional configuration (see FIGS. 5 and 6) for the purpose of achieving high-density integration. Thus, the problem of a contact short occurs similarly to the aforementioned thermal infrared imaging element. For solving the problem of the contact short, the infrared display element of the embodiment can take, forms similar to the thermal infrared imaging elements of the aforementioned first to fourth embodiments.

When the infrared display element of the embodiment employs the form of the thermal infrared imaging element of the aforementioned first embodiment, vertical switch 2002 and horizontal switch 2003 are used to select the pixel immediately to the right of a pixel where a short occurs, i.e. the pixel including a contact connected to a drain of vertical switch 2002, resistor 2001 (bolometer in this case) of the selected pixel is supplied with an overcurrent through signal line 2006 in a vacuum to burn the bolometer itself (trimming processing). This processing can eliminate a current path caused by the contact short and remove the effect on lines in the vertical direction (specifically, the resistance values of two lines in the vertical direction appearing to be 2R/3 due to the contact short).

The trimming processing procedure in the infrared display element of the embodiment is performed similarly to the case of the thermal infrared imaging element of the aforementioned first embodiment, and a system with a similar configuration to the first embodiment is applicable.

When the infrared display element of the embodiment employs the forms of the thermal infrared imaging elements of the aforementioned second to fourth embodiments, similar configurations are used. The detailed description thereof is thus omitted.

Figure 26:
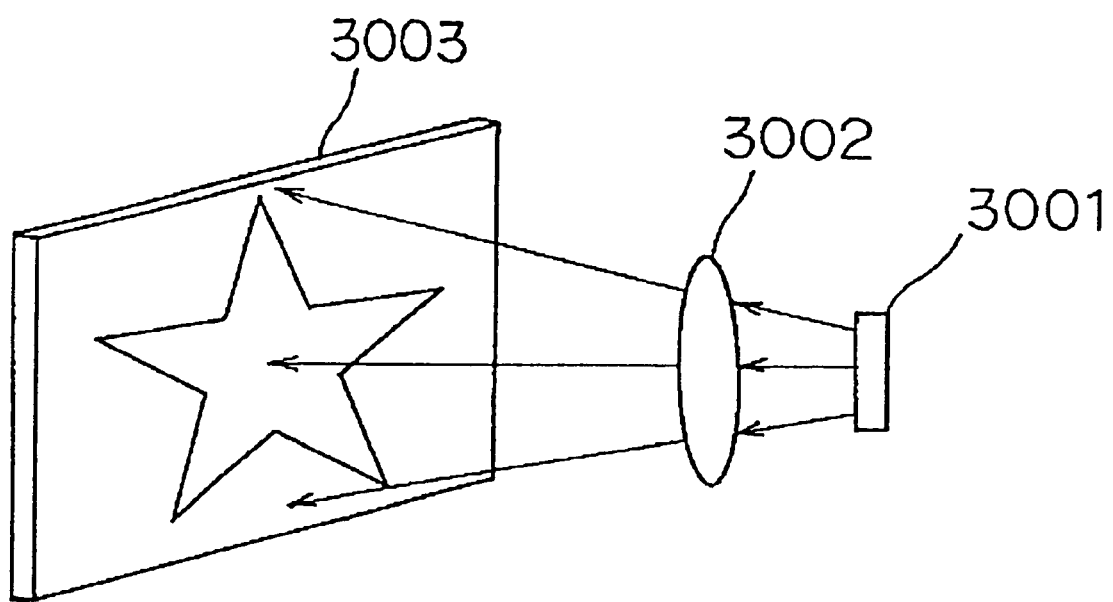
FIG. 26 is a diagram showing an example of a configuration of an infrared display apparatus using the infrared display element shown in FIG. 25.

FIG. 26 shows an example of an infrared display apparatus using the infrared display element of the embodiment. In FIG. 26, infrared display element 3001 is the infrared display element shown in FIG. 25, and driven by a driving circuit, not shown. In the infrared display apparatus, an infrared ray output from infrared display element 3001 are radiated to infrared display 3003 through lens 3002, thereby displaying an image on infrared display 3003.

The aforementioned system shown in FIG. 16 is applicable as a system for performing trimming in the infrared display element of the embodiment. In this case, in the configuration shown in FIG. 16, thermal infrared imaging element 1001 is replaced with the infrared display element of the embodiment in which pixel portion 1002 is configured such that bolometers emitting infrared rays are arranged in two-dimensional form corresponding to pixels, and access circuit 1003 comprises vertical switches 2002, vertical shift register 2004, horizontal switches 2003, and horizontal shift register 2005. CPU 1005 performs similar trimming processing in which respective pixels are sequentially selected, the resistance values of the selected pixels are measured, a pixel with a resistance value deviating from a predefined value is detected based on the measurement results, and an overcurrent is provided to a thin film resistor in a predetermined pixel adjacent to the detected pixel.

While the thermal infrared imaging element and the infrared display element have been described as the embodiments of the semiconductor device of the present invention, the present invention is not limited to these elements. For example, the trimming is applicable to any semiconductor device in which thin film resistors burnable by an overcurrent are arranged in two-dimensional form corresponding to pixels. In addition, the pixel arrangement is applicable to any semiconductor device with the aforementioned three-dimensional configuration in which thin film resistors are arranged in two-dimensional form corresponding to pixels.

According to the present invention configured as described above, when a contact short occurs, its short path can be eliminated to remove the effect of the contact short on lines in the vertical direction, thereby making it possible to improve yields in manufacturing steps. In addition, it is possible to improve the aperture rate in a thermal infrared imaging element and high-density integration in an infrared display element.

When contacts connected to drains of vertical switches are closely disposed, a short of contacts connected to a vertical signal line produces no effect. Thus, the effect of a contact short can be reduced accordingly.

Additionally, when a contact connected to a vertical signal line is used in common for two pixels in the vertical direction, further improvements can be provided in the aperture rate and performance.

Furthermore, when a contact connected to a vertical signal line is disposed close to a contact connected to a drain of a vertical switch in adjacent pixels in the column direction, a short state, even when represented by the resistance value of the pixel including the contact connected to the drain of the vertical switch, causes no effect on two lines in the vertical direction. Thus, the effect of a contact short can be reduced.

While preferred embodiments of the present invention have been described using specific terms, such description is for illustrative purposes only, and it is to be understood that changes and variations may be made without departing from the spirit or scope of the following claims.

What is claimed is:

1. A semiconductor device comprising:
    thin film resistors arranged in two-dimensional form corresponding to pixels for converting incoming infrared rays into electrical signals or for emitting infrared rays; and
    selecting means for selecting an arbitrary thin film resistor from said thin film resistors to supply an overcurrent to the selected thin film resistor.

2. A semiconductor device according to claim 1, wherein said selecting means includes:
    a first semiconductor switch provided to each of the thin film resistors;
    a first shift register connected to each of the thin film resistors through the first semiconductor switch;
    a plurality of vertical signal lines to which the thin film transistors is connected for each column;
    a second semiconductor switch provided to each of the vertical signal lines;
    a second shift register connected to each of the vertical signal lines through the second semiconductor switch.

3. A semiconductor device according to claim 2, further comprising:
    a third shift register for reading an electrical signal converted by the thin film resistor in each of the pixels, and
    wherein electrical signals converted by the thin film resistors in the pixels, which is sequentially selected by the first and third shift registers, is output to the outside.

4. A semiconductor device according to claim 2, wherein a predetermined amount of voltage or current is supplied to the thin film resistor selected by the first and second shift registers.

5. A semiconductor device comprising:
    thin film resistors arranged in two-dimensional form corresponding to pixels for converting incoming infrared rays into electrical signals or for emitting infrared rays;
    a semiconductor switch provided to each of the thin film resistors;
    a signal line to which the thin film transistors is connected for each column;
    a first contact connected to the vertical signal line; and
    a second contact connected to a drain of the semiconductor switch;
    wherein the first contact is disposed close to said second contact in adjacent pixels in the column direction.

6. A semiconductor device comprising:
    thin film resistors arranged in two-dimensional form corresponding to pixels for converting incoming infrared rays into electrical signals or for emitting infrared rays;
    a semiconductor switch provided to each of the thin film resistors;
    a signal line to which the thin film transistors is connected for each column;
    a first contact connected to the vertical signal line; and
    a second contact connected to a drain of the semiconductor switch;
    wherein either the first contacts or the second contacts are disposed close to each other in adjacent pixels in the column direction.

7. A semiconductor device according to claim 6, wherein said first contact is used in common for adjacent pixels in the column direction.

* * * * *